United States Patent [19]

Komiya et al.

[11] Patent Number: 4,761,438
[45] Date of Patent: Aug. 2, 1988

[54] SOFT CONTACT LENS

[75] Inventors: Shigeo Komiya; Niro Tarumi; Hideyuku Futamura, all of Tokyo, Japan

[73] Assignee: Hoya Corporation, Tokyo, Japan

[21] Appl. No.: 927,725

[22] Filed: Nov. 7, 1986

[30] Foreign Application Priority Data

Nov. 11, 1985 [JP] Japan .................. 60-250936

[51] Int. Cl.⁴ .............................. C08J 6/10
[52] U.S. Cl. .................. 523/106; 526/303.1; 526/307.1; 526/312
[58] Field of Search ............ 523/106; 526/303.1, 526/307.7, 312

[56] References Cited

U.S. PATENT DOCUMENTS 4,388,428 6/1983 Kuzma .................. 523/106
4,388,436 6/1983 Chen .................. 526/307.7

Primary Examiner—Joseph L. Schofer
Assistant Examiner—Peter D. Mulcahy
Attorney, Agent, or Firm—Cushman, Darby & Cushman

[57] ABSTRACT

A soft contact lens having a high water content, high mechanical strength and good dimensional stability is disclosed, which is made of a copolymer comprised of at least one monomer represented by formula (1):

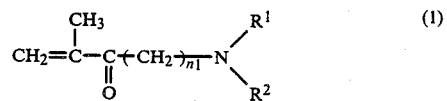

wherein $R^1$ and $R^2$ each represents hydrogen atom, methyl group, or ethyl group, and $n_1$ represents 0 or an integer of 1 to 3.

6 Claims, No Drawings

SOFT CONTACT LENS

FIELD OF THE INVENTION

The present invention relates to a soft contact lens, and more particularly, to a soft contact lens which has a high water content and yet exhibits high mechanical strength as well as excellent dimensional stability.

BACKGROUND OF THE INVENTION

Soft contact lenses have so far been prepared typically from homo- or copolymers of acrylic derivatives having OH groups. These materials swell upon absorbing water, have a high degree of transparency and are possessed of good machining qualities, hence being suitable for use in the making of soft contact lenses having a high degree of comfort and adaptability of the eye.

With a view to permitting extended and continuous wear, high-hydration soft contact lenses having an increased water content has recently been proposed. These high-hydration soft contact lenses are made principally from N-vinylpyrrolidone and have high water content. Because of these features, the lens has a sufficient permeability to supply the oxygen necessary for a physiological environment for the cornea, thereby maintaining the active aerobic metabolism of the cornea and contributing significantly to the attainment of physiological safety for the eye.

However, if the water content of the materials principally made from N-vinylpyrrolidone is increased, they experience an abrupt drop in strength and the lens prepared from such materials is subject to durability-associated problems including complete lens failure and development of surface flaws. In particular, since it has poor elongation and is very liable to be damaged by sudden stress, it must be handled with great care. In addition, the materials per se have such a low water retention that the lens prepared therefrom dries up easily to deform or experience other dimensional instabilities.

A process of overcoming such defects is disclosed in Japanese Patent Application No. 134256/85, wherein a high-hydration soft contact lens having high strength is obtained by the use of a copolymer prepared from N,N-dimethylacrylamide, a specific hydrophobic monomer, an unsaturated carboxylic acid having one ethylenic unsaturated bond, and a crosslinking agent. The high-hydration soft contact lens thus obtained has a large tensile strength, but it has small modulus in tension and is soft so that a problem arises in that the base curves, etc. of the lens are apt to be deformed in use.

SUMMARY OF THE INVENTION

One object, therefore, of the present invention is to provide a contact lens that has a high water content of 60% or more and which yet exhibits high mechanical strength (with respect to modulus, tensile strength and elongation) as well as excellent dimensional stability.

Another object of the present invention is to provide a high-hydration contact lens that has an oxygen permeability high enough to permit extended and continuous wear.

Still another object of the present invention is to provide a colorless and transparent high-hydration contact lens.

The present invention is a soft contact lens which is made of a copolymer comprised of at least one monomer (hereafter referred to as "monomer (1)") represented by formula (1)

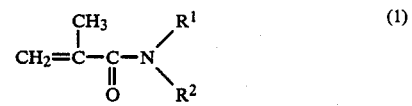

wherein $R^1$ and $R^2$ each represents hydrogen atom, methyl group or ethyl group.

DETAILED DESCRIPTION OF THE INVENTION

The amount of monomer (1) constituting the copolymer is generally from 1 to 30 wt% and preferably from 3 to 15 wt%. When the amount of monomer (1) is less than 1 wt%, the modulus in tension is not so improved, whereas the tensile strength of the resulting contact lens tends to be lowered when it is more than 30 wt%.

In preparation of the copolymer of the present invention, monomer (1) is preferably copolymerized with at least one monomer (hereafter referred to as "monomer (2)") represented by formula (2):

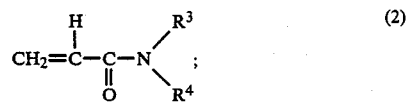

wherein $R^3$ and $R^4$ each represents hydrogen atom, methyl group, or ethyl group and $n_2$ represents 0 or an integer of 1 to 3.

The amount of monomer (2) is preferably from 40 to 90 wt% and more preferably from 45 to 80 wt%. When the amount of monomer (2) is less than 40 wt%, the water content of the soft contact lens tends to be decreased. When it exceeds 90 wt%, the water content considerably increases and the tensile strength becomes small.

Of the monomers (1) and (2) represented by formulae (1) and (2), N,N-dimethylmethacrylamide and N,N-dimethylacrylamide are particularly effective in improvement of the modulus in tension.

The copolymer of the present invention may further comprises a hydrophobic monomer, an unsaturated carboxylic acid having one ethylenically unsaturated bond and a cross-linking agent.

The hydrophobic monomers which can be used in the present invention include phenyl acrylates, benzyl acrylates, phenyl methacrylates, benzyl methacrylates, alkyl acrylates preferably having the alkyl moiety of 4 to 30 carbon atoms, alkyl methacrylates preferably having the alkyl moiety of 4 to 30 carbon atoms, cyclohexyl acrylates, and cyclohexyl methacrylates, which may be substituted with an alkyl group, an alkoxy group, an aryl group, an aralkyl group, an aryloxy group, etc. Examples of these hydrophobic monomers are listed below.

Phenyl acrylates:
phenyl acrylate, p-methylphenyl acrylate, p-methoxyphenyl acrylate, p-ethoxyphenyl acrylate, biphenyl acrylate, and p-benzylphenyl acrylate Benzyl acrylates:
benzyl acrylate, o-methylbenzyl acrylate, p-methylbenzyl acrylate, o-methoxybenzyl acrylate, p-methoxybenzyl acrylate, p-ethoxybenzyl acrylate, p-n-butylbenzyl acrylate, p-phenoxybenzyl acrylate, and p-phenylbenzyl acrylate Phenyl methacrylates:

phenyl methacrylates, p-methylphenyl methacrylate, p-methoxyphenyl methacrylate, p-ethoxyphenyl methacrylate, biphenyl methacrylate, and p-benzylphenyl methacrylate Benzyl methacrylates:

benzyl methacrylate, o-methylbenzyl methacrylate, p-methylbenzyl methacrylate, o-methoxybenzyl methacrylate, p-methoxybenzyl methacrylate, p-ethoxybenzyl methacrylate, p-n-butylbenzyl methacrylate, p-phenoxybenzyl methacrylate, and p-phenylbenzyl methacrylate Cyclohexyl acrylates:

cyclohexyl acrylate, 4-methylcyclohexyl acrylate, 3-ethylcyclohexyl acrylate, 4-t-butylcyclohexyl acrylate, 4-n-butylcyclohexyl acrylate, 4-phenylcyclohexyl acrylate, 4-cyclohexylcyclohexyl acrylate, and 4-phenoxydiethylcyclohexyl acrylate Cyclohexyl methacrylates:

cyclohexyl methacrylate, 4-methylcyclohexyl methacrylate, 3-ethylcyclohexyl methacrylate, 4-t-butylcyclohexyl methacrylate, 4-n-butylcyclohexyl methacrylate, 4-phenylcyclohexyl methacrylate, 4-cyclohexylcyclohexyl methacrylate, and 4-phenoxydiethylcyclohexyl methacrylate Alkyl acrylates:

n-butyl acrylate, 2-ethylhexyl acrylate, lauryl acrylate, and stearyl acrylate

Alkyl methacrylates:

n-butyl methacrylate, 2-ethylhexyl methacrylate, lauryl methacrylate, and stearyl methacrylate The hydrophobic monomers are effective for the purposes of controlling the water content and affording tensile strength and elongation. Cyclohexyl methacrylates are particularly effective in affording tensile strength.

In order to further ensure the intended advantage of the present invention, the use of an unsaturated carboxylic acid having one ethylenically unsaturated bond is advantageous. Incorporation of this unsaturated carboxylic acid permits a greater amount of water to be contained in the contact lens easily. Preferred examples of the unsaturated carboxylic acid include acrylic acid, methacrylic acid, itaconic acid, crotonic acid, fumaric acid, and maleic acid.

The crosslinking agents are effectively used for the purposes of controlling the water content and affording tensile strength. Preferred examples of the crosslinking agent are shown below.

$$CH_2=\overset{X^1}{\underset{|}{C}}-COO(CH_2CH_2O)_a OC-\overset{X^2}{\underset{|}{C}}=CH_2 \quad (3)$$

$$CH_2=\overset{X^1}{\underset{|}{C}}-COO(CH_2CH_2CH_2O)_b OC-\overset{X^2}{\underset{|}{C}}=CH_2 \quad (4)$$

$$CH_2=\overset{X^1}{\underset{|}{C}}-COO(CH_2\overset{CH_3}{\underset{|}{CHO}})_c OC-\overset{X^2}{\underset{|}{C}}=CH_2 \quad (5)$$

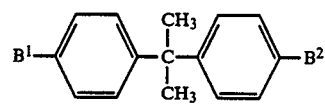   (6)

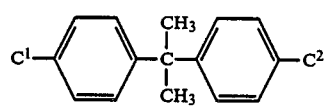   (7)

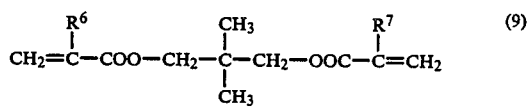   (8)

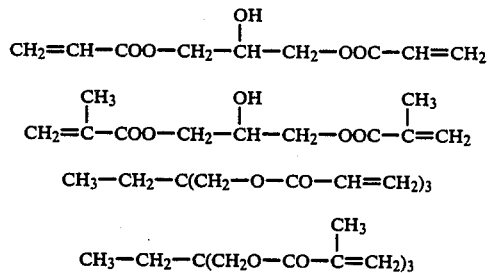   (9)

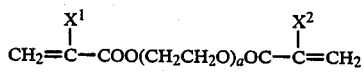

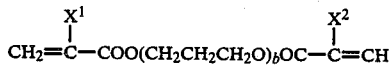

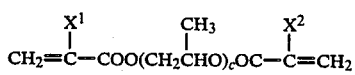

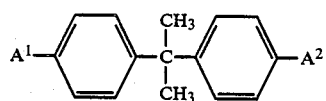

In the above formulae (3) to (9), $A^1$ and $A^2$ each represents $-OCH_2CH_2)_{n3}OOC-CH=CH_2$; $B^1$ and $B^2$ each represents

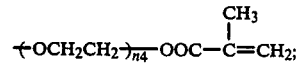

$C^1$ and $C^2$ each represents

$X^1$, $X^2$, $R^5$, $R^6$, and $R^7$ each represents hydrogen atom or methyl group; a represents an integer of 1 to 23, b and c each represents an integer of 1 to 14; and $n_3$ and $n_4$ each represents 0 or an integer of 1 to 9.

The amount of the hydrophobic monomer is preferably from 5 to 55 wt% and more preferably from 15 to 40%. When the amount of the monomer is less than 5 wt%, the tensile strength is not so improved, and when it is more than 55 wt%, the water content decreases. On the other hand, when the ethylenically unsaturated carboxylic acid is used in an amount of less than 0.1 wt%, it is difficult to make the water content larger than 60% depending on the kind of the hydrophobic monomer used in combination. When the ethylenically unsaturated carboxylic acid is used in an amount exceeding 10 wt%, the water content extremely increases but the tensile strength remarkably lowers. Therefore, the amount of the ethylenically unsaturated carboxylic acid is preferably from 0.1 to 10 wt%.

The amount of the crosslinking agent used varies depending on the kind thereof, but is preferably in the range of from 0.01 to 3.0 wt%. By incorporation of the crosslinking agent, the tensile strength can be much improved, as compared with the case where the crosslinking agent is not added.

Preferred contact lens with a water content of 60% or more of the present invention can be manufactured by the following procedure: first, a monomer solution is prepared from a mixture of 1 to 30 wt% of monomer (1), 40 to 90 wt% of monomer (2), 5 to 55 wt% of the hydrophobic monomer, 0.01 to 3.0 wt% of the crosslinking agent, 0.1 to 10 wt% of the unsaturated carboxylic acid having one ethylenically unsaturated bond and 0.01 to 0.5 wt% of a polymerization initiator; the solution then is poured into a predetermined mold; after hermetically sealing the mold, it is heated in a thermostated bath for a predetermined period; the resulting rod is cut into blanks with a predetermined thickness; the blanks are ground and polished to form the lenses of the required optical shape; and the finished lenses are then reswollen by immersion in a physiological saline solution.

The monomer mixture may be directly formed into the final shape of a contact lens by cast polymerization. Alternatively, the polymer may be spin-cast into the desired shape under exposure to ultraviolet radiation.

Polymerization initiators that can be used in the present invention include azobis-based initiators such as azobisisobutyronitrile and azobisvaleronitrile, and peroxide-based initiators such as benzoyl peroxide, lauryl peroxide, diisopropyl peroxide, and diisopropyl peroxydicarbonate.

The contact lens thus produced in accordance with the present invention has the following superior properties:

(1) The lens of the present invention has a high water content and can transmit necessary and sufficient oxygen to the physiological environment for the cornea, which permit extended and continuous wear of the lens.

(2) The lens has high-hydration and yet is possessed of tensile strength and elongation which are far greater than the value exhibited by conventional high-hydration contact lenses. Therefore, the lens of the present invention is free from damages or deformation in the lens shape (e.g., base curves) even in extended and continuous wear;

(3) Commercial soft contact lenses of the type which uses N-vinylpyrrolidone as the primary component have a pale yellow color but the lens of the present invention is colorless and transparent and has a high transmittance of visible light; and (4) Since the material of a conventional high-hydration lens itself has poor water-retaining property, water evaporates from the lens to change the water content when used in dry atmosphere, resulting in deformation of the lens shape. On the contrary, the lens of the present invention has low water-evaporation rate and to scarcely deformed in dry atmosphere.

(5) Since the copolymer of the lens is hard, the lens is advantageous in that it can be readily processed by race cutting, polishing, etc.

The following working examples and comparative examples are provided for the purpose of further illustrating the present invention but are by no means to be taken as limiting. In the examples, all "parts" are by weight.

EXAMPLE 1

A monomer solution consisting of a mixture of N,N-dimethylacrylamide (54 parts), N,N-dimethylmethacrylamide (10 parts), cyclohexyl methacrylate (34 parts), diethylene glycol dimethacrylate (0.2 part), acrylic acid (2 parts) and azobisisobutyronitrile (0.05 part) was poured into a mold, which was hermetically sealed and heated in a thermostated bath from 50° to 120° C. over a period of 24 hours. After completion of the polymerization, the mold was cooled to room temperature and the resulting copolymer was separated. The copolymer was a colorless and transparent hard material.

This polymer was shaped into a contact lens by conventional methods of machining and polishing.

The finished lens was swollen by immersion in a 0.9% physiological saline solution. The swollen lens was as colorless and transparent as it was in the dry state. The light transmission coefficient of the lens (0.2 mm thick) in a 0.9% physiological saline solution was 98.5%.

EXAMPLES 2 TO 8 AND COMPARATIVE EXAMPLE 2

Samples of swollen contact lenses were prepared as in Example 1 except that the composition of the monomer mixture was changed to those indicated in Table 1.

The water content, modulus in tension, tensile strength, elongation, and oxygen permeability coefficient ($PO_2$) of each sample were measured and the results are shown in Table 1.

TABLE 1

| Example No. | Mixture component (part by weight) | Water content[*1] | Modulus in tension[*3] | Tensile strength[*3] | Elongation[*4] | $PO_2$[*2] |
| --- | --- | --- | --- | --- | --- | --- |
| 1 | DMAA/DMMA/CHMA/AA/A (54/10/34/2/0.2) | 72 | 160 | 480 | 220 | 42 |
| 2 | DMAA/DMMA/CHMA/AA/A (52/10/34/3/0.2) | 76 | 120 | 370 | 260 | 44 |
| 3 | DMAA/DMMA/CHMA/AA/A (52/10/34/4/0.2) | 81 | 100 | 270 | 240 | 51 |
| 4 | DMAA/DMMA/CHMA/AA/A (42/20/34/4/0.2) | 73 | 240 | 450 | 200 | 42 |
| 5 | DMAA/DMMA/BZHA/AA/A (54/8/34/4/0.5) | 68 | 210 | 520 | 200 | 36 |
| 6 | DMAA/DMMA/PHMA/MAA/C (80/2/17/1/1.5) | 83 | 190 | 220 | 210 | 55 |
| 7 | DMAA/DMMA/LAMA/MAA/D (45/25/22/8/0.8) | 77 | 150 | 290 | 230 | 44 |
| 8 | DEMA/DMMA/EHA/IA/E (52/15/30/3/0.1) | 79 | 130 | 330 | 240 | 46 |
| Comparative Example 1 | DMAA/CHMA/AA/A (62/34/4/0.2) | 80 | 48 | 250 | 340 | 47 |
| Comparative | DMAA/EHA/AA/C | 81 | 28 | 223 | 410 | 54 |

TABLE 1-continued

| Example No. | Mixture component (part by weight) | Water content*1 | Modulus in tension*3 | Tensile strength*3 | Elongation*4 | PO₂*2 |
|---|---|---|---|---|---|---|
| Example 2 | (66/30/4/0.2) | | | | | |

Abbreviations for Monomers:
DMAA: N,N—Dimethylacrylamide
DEMA: 2-Diethylaminoethyl methacrylate
DMMA: N,N—Dimethylmethacrylamide
PHMA: Phenyl methacrylate
LAMA: Lauryl methacrylate
BZMA: Benzyl methacrylate
CHMA: Cyclohexyl methacrylate
EHA: 2-Ethylhexyl acrylate
A: Diethylene glycol dimethacrylate
B: Tripropylene glycol dimethacrylate
C: Triethylene glycol dimethacrylate
D: Propylene glycol diacrylate
E: Vinyl methacrylate
MAA: Methacrylic acid
AA: Acrylic acid
IA: Itaconic acid
(Note)

*1 Water content (wt %) = $\frac{W_1 - W_2}{W_1} \times 100$ wherein $W_1$ is the hydrated lens weight, and $W_2$ is the dehydrated lens weight.
*2 Measurement of oxygen permeability coefficient (PO₂) was conducted at 30° C. with a film oxygen permeameter (product of Rika Seiki Kogyo K.K.). The unit for oxygen permeability coefficient is $10^{-11}$ ml · cm/cm² · sec · mmHg. The thickness of the sample was 0.2 mm.
*3 The modulus in tension and the tensile strength of each sample were determined by measuring the breaking strength in a physiological saline solution (20° C.) at a constant loading speed of 60 cm/min. The units modulus in tension and for tensile strength are g/mm².
*4 The elongation of each sample was determined by measuring the breaking elongation.

Elongation (%) = $\frac{L_2 - L_1}{L_1} \times 100$ wherein $L_1$ is the initial strength of a test piece; and $L_2$ is the length of the test piece immediately before breaking.

The samples prepared in Examples 1 to 8 were colorless and transparent and exhibited higher degrees of oxygen permeability than the comparative samples. In addition, the modulus in tension and tensile strength of sample Nos. 1 to 8 far exceeded the values attained by the comparative samples which did not include N,N-dimethylmethacrylamide.

Such superior mechanical properties are only manifested by using monomer (1), i.e., N,N-dimethyl methacrylamide preferably in combination with monomer (2), a specified hydrophobic monomer containing the benzene ring, cyclohexyl ring or long-chained alkyl group, and with a specified long-chained crosslinking agent. The water content of the lens is improved by combining monomer (2), e.g., N,N-dimethyl acrylamide, with an unsaturated carboxylic acid having one ethylenically unsaturated bond.

While the invention has been described in detail and with reference to specific embodiments thereof, it will be apparent to one skilled in the art that various changes and modifications can be made therein without departing from the spirit and scope thereof.

What is claimed is:

1. A soft contact lens made of a copolymer comprised of at least one monomer represented by formula (1):

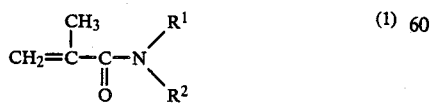

wherein $R^1$ and $R^2$ each represents hydrogen atom, methyl group, or ethyl group; said copolymer further comprising at least one monomer represented by formula (2):

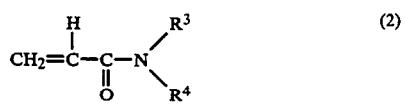

wherein $R^3$ and $R^4$ each represents hydrogen atom, methyl group, or ethyl group;
said copolymer including,
a hydrophobic monomer, selected from the group consisting of phenyl acrylates, benzyl acrylates, phenyl methacrylates, benzyl methacrylates, cyclohexyl acrylates and cyclohexyl methacrylates, an unsaturated carboxylic acid having one ethylenically unsaturated bond, and a crosslinking agent.

2. A soft contact lens as in claim 1, wherein said monomer of formula (1) is N,N-dimethylmethacrylamide.

3. A soft contact lens as in claim 1, wherein said monomer of formula (2) is N,N-dimethylacrylamide.

4. A soft contact lens as in claim 1, wherein said copolymer comprises 1 to 30 wt% of a monomer of formula (1), 40 to 90 wt% of a monomer of formula (2), 0.1 to 10 wt% of an unsaturated carboxylic acid having one ethylenic unsaturated bond, 5 to 55 wt% of a hydrophobic monomer, and 0.01 to 3.0 wt% of a crosslinking agent, and the water content of said soft contact lens is 60% or more.

5. A soft contact lens made of a copolymer comprising:
at least one monomer represented by formula (1):

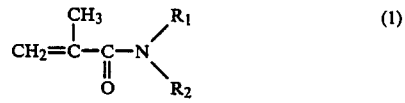

wherein $R^1$ and $R^2$ each represent hydrogen atom, methyl group, or ethyl group; and at least one monomer represented by formula (2):

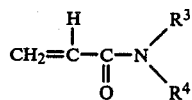
(2)

wherein $R^3$ and $R^4$ each represents hydrogen atom, methyl group, or ethyl group.

6. The soft contact lens made of a copolymer comprising:
- 1 to 30 wt% N,N-dimethylmethacrylamide;
- 40 to 90 wt% N,N-dimethylacrylamide;
- 0.1 to 10 wt% of an unsaturated carboxylic acid having one ethylenic unsaturated bond;
- 5 to 55 wt% of a hydrophobic monomer;
- 0.01 to 3.0 wt% of a crosslinking agent; and
said soft contact lens having a water content of 60% or more.

* * * * *